(12) United States Patent
Niederberger et al.

(10) Patent No.: US 9,784,624 B2
(45) Date of Patent: Oct. 10, 2017

(54) PORTABLE ELECTRONIC DEVICE WITH COMPENSATED AMBIENT TEMPERATURE MEASUREMENT

(71) Applicant: Sensirion AG, Stafa (CH)

(72) Inventors: Dominik Niederberger, Zurich (CH);
Andrea Sacchetti, Zurich (CH);
Dominic Boni, Dielsdorf (CH)

(73) Assignee: Sensirion AG, Stafa (CH)

( * ) Notice: Subject to any disclaimer, the term of this patent is extended or adjusted under 35 U.S.C. 154(b) by 451 days.

(21) Appl. No.: 14/264,642

(22) Filed: Apr. 29, 2014

(65) Prior Publication Data

US 2014/0328368 A1 Nov. 6, 2014

(30) Foreign Application Priority Data

May 6, 2013 (EP) .................................. 13002395

(51) Int. Cl.
*G01K 15/00* (2006.01)
*G01K 1/20* (2006.01)
*H04M 1/21* (2006.01)
*G01K 7/42* (2006.01)

(52) U.S. Cl.
CPC ............... *G01K 1/20* (2013.01); *G01K 7/427* (2013.01); *G01K 15/005* (2013.01); *H04M 1/21* (2013.01); *H04M 2250/12* (2013.01)

(58) Field of Classification Search
CPC .................................................. G01K 15/005
USPC ......................................................... 374/1–3
See application file for complete search history.

(56) References Cited

U.S. PATENT DOCUMENTS

| 3,817,453 A | 6/1974 | Pinckaers |
| 4,096,575 A | 6/1978 | Itoh |
| 4,789,992 A * | 12/1988 | Wickersheim ..... G01K 11/3213 250/458.1 |

(Continued)

FOREIGN PATENT DOCUMENTS

| DE | 102011101355 | 11/2012 |
| EP | 0387025 | 9/1990 |

(Continued)

OTHER PUBLICATIONS

European Search Report No. in Application No. 13002395.5 dated Oct. 29, 2013.

*Primary Examiner* — Clayton E LaBalle
*Assistant Examiner* — Leon W Rhodes, Jr.
(74) *Attorney, Agent, or Firm* — Cooper & Dunham LLP

(57) ABSTRACT

In a portable electronic device, a temperature sensor is provided for sensing an ambient temperature of the portable electronic device. At least one other temperature sensor is provided for sensing a temperature inside the portable electronic device. The portable electronic device further comprises a set of components radiating heat in an active state in response to the consumption of electrical energy. A calibration module is adapted to conduct a calibration measurement during or in connection with an active state of at least a first component out of the set, and is adapted to determine a set of calibration parameters in response to the calibration measurement for adjusting the at least one sensed inside temperature. A compensator is provided for determining a compensated ambient temperature dependent on at least the sensed ambient temperature and the at least one adjusted sensed inside temperature.

15 Claims, 2 Drawing Sheets

(56) References Cited

U.S. PATENT DOCUMENTS

| | | |
|---|---|---|
| 5,199,637 A | 4/1993 | Adams |
| 5,502,838 A | 3/1996 | Kikinis |
| 5,603,101 A | 2/1997 | Choi |
| 5,721,837 A | 2/1998 | Kikinis et al. |
| 6,697,645 B1 | 2/2004 | MacFarlane |
| 6,708,279 B1 * | 3/2004 | Takenaka ............... G06F 1/3203 347/17 |
| 6,912,386 B1 | 6/2005 | Himberg et al. |
| 7,027,834 B2 * | 4/2006 | Soini ....................... H04M 1/21 340/501 |
| 7,280,301 B1 | 10/2007 | Jackson et al. |
| 7,364,353 B2 | 4/2008 | Kolk |
| 9,286,838 B2 * | 3/2016 | Yoshida ................. G01K 7/427 |
| 2008/0143522 A1 | 6/2008 | Sung |
| 2009/0144014 A1 | 6/2009 | Aljabari |
| 2010/0268475 A1* | 10/2010 | Kusumoto ......... G01N 27/3274 702/19 |
| 2010/0307916 A1 | 12/2010 | Ramey et al. |
| 2011/0119018 A1 | 5/2011 | Skarp |
| 2011/0191059 A1* | 8/2011 | Farrell ............... A61B 5/14532 702/130 |
| 2011/0221820 A1* | 9/2011 | Shibata ................ B41J 2/04563 347/17 |
| 2011/0307208 A1 | 12/2011 | Graf et al. |
| 2012/0224602 A1 | 9/2012 | Crafts et al. |
| 2013/0124127 A1* | 5/2013 | Ahuja .................... G01C 25/00 702/86 |
| 2014/0328367 A1 | 11/2014 | Niederberger et al. |

FOREIGN PATENT DOCUMENTS

| | | | |
|---|---|---|---|
| EP | 1301014 | | 4/2003 |
| JP | 2010101741 | | 5/2010 |
| JP | 2010152587 A | * | 7/2010 |
| WO | 0169341 | | 9/2001 |
| WO | 2013045897 | | 4/2013 |
| WO | 2014005235 | | 1/2014 |

* cited by examiner

PORTABLE ELECTRONIC DEVICE WITH COMPENSATED AMBIENT TEMPERATURE MEASUREMENT

CROSS REFERENCE TO RELATED APPLICATIONS

This application claims the priority of European patent application 13002395.5, filed May 6, 2013, the disclosure of which is incorporated herein by reference in its entirety.

TECHNICAL FIELD

The present invention relates to a portable electronic device, to a method for operating a portable electronic device, and to a computer program element for operating a portable electronic device.

BACKGROUND ART

It is desired to conduct a precise measurement of the ambient temperature with a portable electronic device such as a mobile phone or a portable computing device such as a tablet computer, which portable electronic device typically comprises a processor and/or a display generating heat during operation.

DISCLOSURE OF THE INVENTION

According to a first aspect of the present invention, a portable electronic device is provided.

The portable electronic device comprises a temperature sensor for sensing a temperature ambient the portable electronic device which temperature sensor typically provides a sufficient coupling to the environment of the portable electronic device, e.g. by being exposed to the ambient through openings in a housing of the device or other means. However, given that the portable electronic device, which may be a mobile phone or a portable electronic computing device in one embodiment, typically comprises components that in an active state consume electrical power and thereby release heat, such as a central processing unit and/or a display, the ambient temperature sensed by the temperature sensor may be impacted in view of heat migrating from such components to the temperature sensor. This may result in that the temperature sensed by the temperature sensor no longer reflects the real ambient temperature but reflects the real ambient temperature perturbed by the self-heating of the device.

Hence, the present portable electronic device comprises at least one other temperature sensor for sensing a temperature inside the portable electronic device. Such other temperature sensor/s may be arranged inside a casing of the portable electronic device, and for example, may provide a good thermal coupling to an assigned component in case a temperature of this component shall be sensed. For example, in case the temperature of a central processing unit of the device shall be sensed by such other temperature sensor, it may be preferred that this other temperature sensor is arranged close to the central processing unit, and possibly may be integrated as a resistive temperature sensor into a chip containing the central processing unit. For example, in case the temperature of a rechargeable battery of the device shall be sensed by another temperature sensor, it may be preferred that this other temperature sensor is arranged close to the battery including a sufficient thermal coupling to the battery. However, in other embodiments, one or more other temperature sensors may be arranged in the casing of the portable electronic device without being specifically assigned to a heat radiating component but may be arranged at a location on the circuit board. Hence, the one or more other temperature sensors may sense temperatures at different locations within the device.

In addition, the present portable electronic device comprises a compensator for determining a compensated ambient temperature which preferably better reflects the real ambient temperature. This compensated ambient temperature represents an estimate of the real ambient temperature based on the sensed ambient temperature as supplied by the temperature sensor and by taking into account the heat generated by at least one heat releasing electronic component of the device sensed by at least one other temperature sensor. As a result, the sensed ambient temperature preferably may be corrected by a temperature value owed to the heat generated from the subject component and transferred therefrom to the temperature sensor. As a result, the compensated ambient temperature may be determined dependent on the sensed ambient temperature and the one or more sensed inside temperatures. In a preferred embodiment, the compensator comprises a compensation model for modelling an impact of the heat on the sensed inside temperature/s and propagated via one or more heat paths to the temperature sensor for sensing the ambient temperature.

However, the one or more other temperature sensors used in such portable electronic device may not necessarily provide the correct inside temperature but may suffer from an offset or other manufacturing, circuit related or aging effects. Hence, it is preferred to calibrate these one or more other temperature sensors. This may be achieved by a calibration module which preferably is embodied as software to be executed on the central processing unit of the portable electronic device. The calibration module is adapted to conduct a calibration measurement during or in connection with an inactive state of all components of a set of components. Under the assumption that during their inactive state these components do not radiate heat, it may be expected that the inside temperature/s may be equal to the ambient temperature such that the temperature sensor and the other temperature sensor/s should sense essentially the same temperature.

In one embodiment, the set may comprise only the components that are the major heat sources of the device during operation, i.e. while these components being active. For example, a sample set for a mobile phone or a tablet computer may include a central processing unit, an energy storage, a display, and a radio frequency transceiver. It is preferred that at least the components of the set each are inactive during the calibration measurement.

An inactive state of a component may be understood as a state in which the subject component does not radiate any heat or does radiate only little heat such that the ambient temperature sensing is not interfered. In the latter embodiment, it is not required that the subject component is completely powered down and prevented from consuming any electrical energy. Components may also be in a sleep mode, for example, while still being inactive given that in the sleep mode the energy consumed by the subject component may be negligible and the resulting heat at least has no impact on the ambient temperature sensing.

Hence, in case the set does not comprise all components of the device but a selection thereof constituting the major heat sources, the calibration measurement may be conducted while all these components are in a sleep mode, for example, such that the central processing unit at least remains powered in the background for conducting the calibration measurement. Here, it may be assumed that the calibration measurement does not generate too much heat in the central processing unit such that the central processing unit does not radiate sufficient heat to interfere with the ambient temperature sensing. In such embodiment, it may be the central processing unit monitoring the states of the components of the set. In case all the components are detected as inactive, the calibration measurement may be initiated. In another embodiment, it may be preferred that even the central processing unit is inactive. In such scenario, the relevant temperature sensors may autonomous or via a sensor hub including a basic processing power log the sensed temperature values to some memory without having the central processing unit as a heat generating component be involved. Here, the calibration measurement may even be conducted during a stand-by state of the portable electronic device in which at least background routines such as for logging sensed temperature values may be active. The determination of the set of calibration parameters dependent on the sensed ambient and inside temperature/s may be conducted offline from taking the temperature values, for example, whenever the central processing unit is activated later on.

In another embodiment, a powered down state of the entire portable electronic device—also known as deep sleep—represents the inactive state of the device and of its components such that the calibration measurement may preferably be conducted not during but in connection with a power down state of the device. This means that the calibration measurement is not conducted during the powered down state given that no energy is provided to the calibration module during this period. However, the calibration measurement may be conducted in connection with the powered down state, for example shortly thereafter. A measurement soon after a power on of the device is legitimate despite the components of the device already consuming power at this point in time. However, for growing and radiating heat it may take a few seconds such that as long as the calibration measurement is taken early enough after powering the device on, the generated heat does not interfere yet with the calibration measurement such that the inside temperatures can still be assumed to correspond to the ambient temperature.

The very same way of calibration measurement may also be conducted in connection with a stand-by state of the portable electronic device. The stand-by state differs from the powered down state in that some background routines are still active, e.g. for monitoring an input such as a touchscreen for reactivating the device. The calibration measurement may also be taken soon after the stand-by mode is deactivated. All other embodiments valid for the powered down state are also applicable in connection with the stand-by state. In addition, during the stand-by state an autonomous engine in the device may automatically reactivate the central processing unit for a short period of time for conducting the calibration measurement, while the device as such remains in the stand-by state.

In a preferred embodiment, the calibration measurement may be triggered in response to powering on the portable electronic device. The powering on shall encompass a powering on by means of a power button, and the reactivation out of a stand-by state by means of the power button, a separate button, or another input means such as a touchscreen, a microphone, etc. In a very preferred embodiment which reflects what is described above, the calibration measurement is conducted within a defined interval in time starting with the powering on of the portable electronic device in order not to be exposed to undue heat. In case this defined interval has passed, the calibration measurement is not initiated.

In another very preferred embodiment, it is monitored for how long the portable electronic device was powered down or in a stand-by state before it is powered on again. Hence, the preceding power down/stand-by period of the device is determined, and it may be evaluated if such period is sufficient for previously active components having sufficiently cooled down, and preferably having cooled down to ambient temperature. Hence, the period in time for which the device was powered down/in a stand-by state preferably is compared to a threshold of, for example 15 minutes, which threshold represents a minimum period in time considered as sufficient cooling the components down. The period in time the device was powered down/in a stand-by state may be determined by logged power on and power down time stamps.

In another preferred embodiment, the calibration measurement is only executed when it is detected that the device is presently not recharged. It is preferred that the device has a rechargeable energy storage for supplying energy for the device operations. Given that a recharge process heats the energy storage, it is preferred that the calibration measurement is not conducted during the device being recharged. For this purpose, it may be detected if the device is connected to a charging cable, or if a charging current is present.

The calibration measurement may generally be executed soon after start running the device for the first time, and/or thereafter in regular intervals, and/or when suited states of the components are detected.

The set of calibration parameters may include at least one calibration parameter which, for example, may be applied to the inside temperature. The set may preferably include a calibration parameter assigned to each other temperature sensor, or may even contain multiple calibration parameters for each other temperature sensor. In a preferred embodiment, the calibration parameter assigned to a dedicated other temperature sensor may adjust the inside temperature sensed by this other temperature sensor such that finally the compensated ambient temperature is determined dependent on the adjusted sensed inside temperature/s, and dependent on the sensed ambient temperature which of course may also include a sensed ambient temperature adjusted by an associate calibration parameter.

Under the assumption, that during a calibration measurement the inside temperature/s are essentially the same as the ambient temperature, the inside temperature/s sensed during the calibration measurement is/are compared to the ambient temperature sensed during the calibration measurement. Here, it is assumed that the temperature sensor for sensing the ambient temperature acts as a reference for the other temperature sensors, and may either be an ideal sensor or be calibrated by other means. A calibration parameter may then be derived from a deviation of the sensed inside temperature from the sensed ambient temperature. For example, a calibration parameter may be equal to a ratio r of the deviation versus the ambient temperature, which calibration parameter r may during regular sensing operations be applied in the following way:

$$\text{adjusted sensed inside temperature} = T_1 + r*T_1$$

with $T_1$ being the sensed inside temperature. The calibration parameter for each of the other temperature sensor may preferably be determined as described above.

In another embodiment, one of the other temperature sensors may act as a reference sensor for the rest of the other temperature sensors instead of the ambient temperature sensor.

In another embodiment, the one or more other temperature sensors may show an elevated temperature compared to the ambient temperature even in case of no heat being generated in the device and in case of a sufficient cooling down period since the previous heating. This effect may be owed to the arrangement of the subject other temperature sensors, which may, for example, be "buried" in the device at a location, e.g. in a circuit or a chip, where there is no sufficient access to the ambient air. Hence such temperature sensor may even in the above scenario show a temperature of e.g. two or three degrees above the ambient temperature, irrespective of the value of the ambient temperature. Such effect may be respected in the determination of the calibration parameter such that the sensed inside temperature may be compared to the sensed ambient temperature plus x degrees. Hence, the calibration parameter for such other temperature sensor may depend on the deviation of the sensed inside temperature from the sensed ambient temperature elevated by x degrees.

In another embodiment, a different approach is taken for determining a calibration parameter of the set. Again, it is assumed, that the sensed ambient temperature is already calibrated or otherwise free of drift. Given that the sensed inside temperatures are subject to drift, the compensated ambient temperature may show a different result than in the case of the sensed inside temperatures being absent of any drift. In the latter case, the compensated ambient temperature would not differ from the sensed ambient temperature given that no heat interferes with the calibration measurement and the other temperature sensors would sense the ambient temperature. However, in case the sensed inside temperature/s show drift, the compensated ambient temperature may differ from the sensed ambient temperature. Subject to the underlying thermal compensation model, the deviation of the compensated ambient temperature from the sensed ambient temperature may allow to conclude to an offset, e.g. in the one or more other temperature sensor/s and as such may allow to determine the set of calibration parameters.

Preferably, the portable electronic device may be one of a mobile phone, and especially a smart phone, a handheld computer, an electronic reader, a tablet computer, a game controller, a pointing device, a photo or a video camera, a computer peripheral.

According to another aspect of the present invention, a method is provided for operating a portable electronic device. The portable electronic device contains a set of components radiating heat in an active state in response to the consumption of electrical energy. An ambient temperature of the portable electronic device is sensed by means of a temperature sensor. At least one temperature inside the portable electronic device is sensed by at least one other temperature sensor. A calibration measurement is conducted for determining a set of calibration parameters for adjusting the at least one sensed inside temperature. The calibration measurement is conducted during or in connection with an inactive state of the components of the set. A compensated ambient temperature is determined dependent on at least the sensed ambient temperature and dependent on the at least one adjusted sensed inside temperature.

According to a further aspect of the present invention, a computer program element is provided for operating a portable electronic device, which computer program element, which preferably is stored on a computer storage medium, comprises computer program code means for executing a method according to any of the embodiments of the present invention.

Other advantageous embodiments are listed in the dependent claims as well as in the description below. The described embodiments similarly pertain to the device, the method, and the computer program element. Synergetic effects may arise from different combinations of the embodiments although they might not be described in detail.

Further on it shall be noted that all embodiments of the present invention concerning a method might be carried out in the order of the steps as described. Nevertheless this has not to be the only essential order of steps but all different orders of the method steps shall be comprised in the scope of the claims and be disclosed by the method claims.

BRIEF DESCRIPTION OF THE DRAWINGS

The detailed description refers to embodiments of the present invention. Such description makes reference to the annexed drawings, wherein.

DETAILED DESCRIPTION

Figure 1:
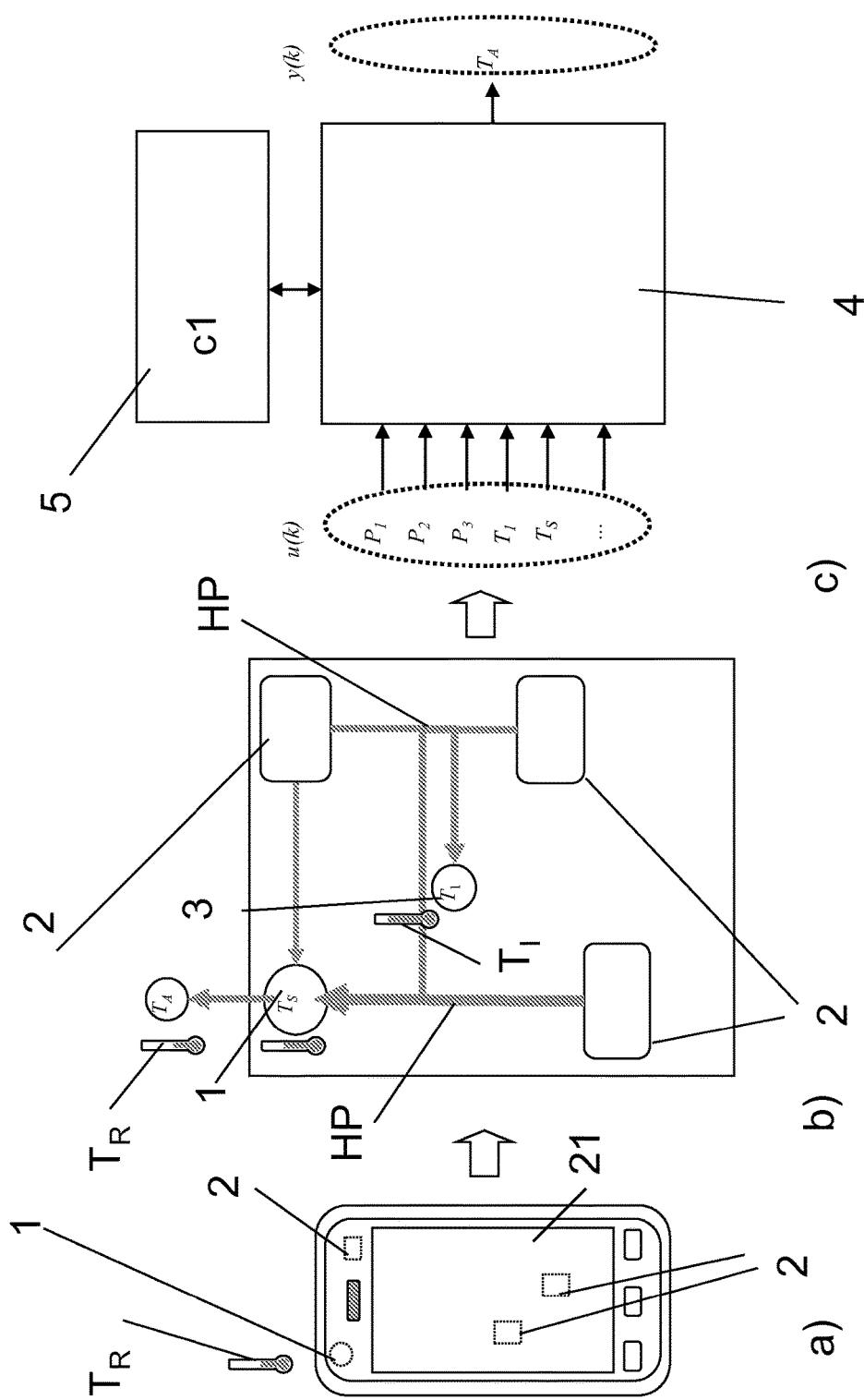
FIG. 1 illustrates a mobile phone according to an embodiment of the present invention in diagram a), an associated thermal block diagram in diagram b), and an associate compensator in diagram c)

FIG. 1a) shows a diagram illustrating a mobile phone according to an embodiment of the present invention. The mobile phone includes a temperature sensor 1 and several components 2 generating heat during operation of the mobile phone, such as a display 21. The temperature sensor 1 provides a sensed ambient temperature $T_S$.

The temperature sensor 1 itself may not provide the real ambient temperature $T_R$ but a sensed ambient temperature $T_S$ deviating from the real ambient temperature $T_R$ because of a self-heating of the device that perturbs the internal temperature sensor 1. Hence, the signal of the integrated temperature sensor 1 is compensated for this effect. The compensator preferably uses information of one or more other temperature sensors 3 for sensing a temperature $T_I$ inside the device, one of which other temperature sensors 3 is depicted in FIG. 1a). Such other temperature sensor 3 senses a temperature at the subject location which qualifies for determining an impact of heat, e.g. generated by components arranged close to the other temperature sensor 3. However, the other temperature sensor 3 may not provide the real inside temperature $T_I$ either but a sensed inside temperature $T_1$ deviating from the real inside temperature $T_I$ owed to offset or other drift effects, for example. In addition to the one or more sensed inside temperatures $T_1$, information related to the power consumed by one or more of the components 2 may serve as input to the compensation model. Moreover, the heat propagation in time towards the temperature sensor 1 may also be reflected in the thermal compensation model such that its influence can be compensated from the sensed ambient temperature $T_S$. Summarizing, the real ambient temperature $T_R$ is desired to be estimated by the portable electronic device by determining a compensated ambient temperature $T_A$.

In diagram 1b), a "thermal" block diagram of the mobile phone of diagram 1a) is shown in which the heat generating components 2 are connected to the temperature sensor 1 and to each other by heat paths HP on which heat flux is propagated. Preferably, such heat flux propagating to the temperature sensor 1 may be determined and be compensated for at the temperature sensor 1 by a compensator 4 as is shown in diagram 1c). The compensator 4 may be an entity, represented by hardware, software, or a combination of both, which receives the sensed ambient temperature $T_S$, the sensed inside temperature $T_1$, and information $P_1$, $P_2$, $P_3$ related to the power consumption of the three components 2 identified as most crucial in impacting the sensed ambient temperature $T_S$. The compensator 4 supplies at its output the compensated ambient temperature $T_A$. A calibration module is schematically referred to as 5.

In general, the compensator 4 may make use of a dynamic thermal model of the mobile device such as, for example, is shown in diagram 1b). The dynamic thermal model may mathematically be described by a differential equation system. The model may in one embodiment comprise one or more, and preferably the most relevant heat sources, and in another embodiment additionally one or more, and preferably the most relevant thermal conductivities, and in another embodiment additionally one or more, and preferably the most relevant heat capacities, as well as it comprises the temperature sensor that is well coupled to the ambient, and it may comprise one or more optional temperature sensors that may be available in the mobile device.

The compensated ambient temperature $T_A$ may then be estimated from these inputs by using the following Equation 1) as compensator 4:

$$x(k+1) = Ax(k) + Bu(k)$$
$$y(k) = Cx(k) + Bu(k)$$

Collectively Equation 1)

with u(k) denoting the inputs at time step k, y(k) denoting the output $T_A$, and x(k) denoting an internal state vector. A is an n-by-n matrix, B an n-by-m matrix, C an 1-by-n matrix and D an 1-by-m matrix, where n is the number of states that depends on the complexity of the model and m the number of inputs. Typical inputs may be, for example, an intensity of a display, a time derivative of a battery charge level, a central processing unit load, or other power management information. Additional temperature sensors at hot spots of the portable electronic device may improve the compensation results.

Hence, in one embodiment, the portable electronic device is modelled as a thermal system with heat sources, and optionally with heat capacities and/or thermal conductivities. From this model, a time-discrete compensator according to the state space description of Equation 1) is derived, that can easily be implemented on a microprocessor of the portable electronic device by using the following software code:

```
while not stopped
{
    u=Read_Input( );        // Read input
    y=C*x+D*u;              // Calculate output
    x=A*x+B*u;              // State Update
    T_A=y;                  // Ambient Temperature = y
}
```

The compensated ambient temperature $T_A$ may be displayed on the display 21.

Figure 2:
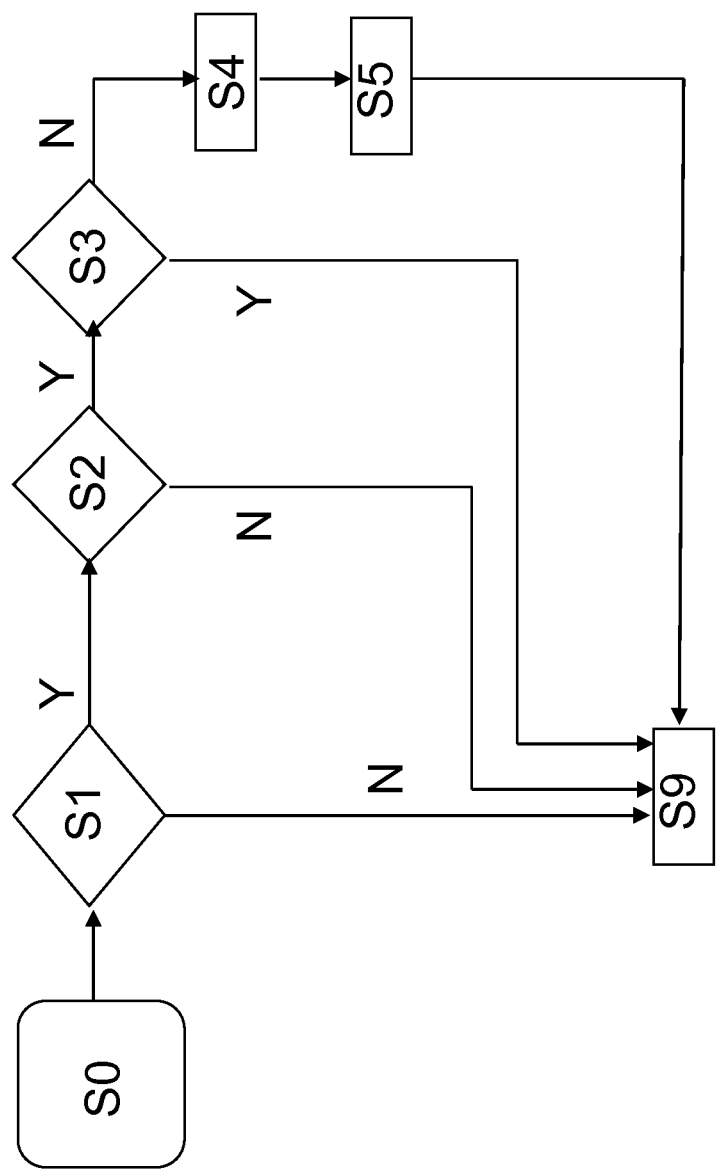
FIG. 2 shows a flowchart of a method according to an embodiment of the present invention.

FIG. 2 illustrates a flow chart of a method according to an embodiment of the present invention. In step S0 the portable electronic device is powered on by the user, after being completely powered off, or after a stand-by mode. In step S1 a flag is verified which flag indicates if calibration parameters for temperatures sensed inside a casing of a portable electronic device shall be determined. If so (Y), in step S2 it is verified, if the power down or stand-by period previous to the powering on exceeds a defined period in time during which it safely can be assumed that the device has sufficiently cooled down inside. If so (Y), it is verified in step S3 if the time since having powered on the device in step S0 has exceeded a threshold. If not (N), the ambient temperature is sensed by means of an assigned temperature sensor and the one or more inside temperatures are taken by the corresponding other temperature sensors in step S4. In step S5, a deviation of each sensed inside temperature from the sensed ambient temperature is calculated, and a calibration parameter for each sensed inside temperature is derived therefrom.

In the following, it can be switched to a regular temperature sensing mode in step S9, wherein the temperature sensor and the other temperature sensors provide temperature values to a compensation model which determines a compensated ambient temperature based on these inputs and based on the calibration parameters applied to the sensed inside temperatures. In case one of the requirements in step S1 or S2 being not fulfilled or in step S3 being fulfilled, it is also switched to the regular temperature sensing mode in step S9. Here, any previous calibration parameters may be used.

While there are shown and described presently preferred embodiments of the invention, it is to be distinctly understood that the invention is not limited thereto but may be otherwise variously embodied and practiced within the scope of the following claims.

The invention claimed is:

1. Portable electronic device, comprising
   a temperature sensor for sensing an ambient temperature of the portable electronic device,
   at least one other temperature sensor for sensing a temperature inside the portable electronic device,
   a set of components radiating heat in an active state in response to the consumption of electrical energy,
   a calibration module adapted to conduct a calibration measurement during or in connection with an inactive state of the components of the set, and adapted to determine a set of calibration parameters in response to the calibration measurement for adjusting the at least one sensed inside temperature, and
   a compensator for determining a compensated ambient temperature dependent on at least the sensed ambient temperature and the at least one adjusted sensed inside temperature
   wherein the calibration module is adapted to conduct the calibration measurement in response to a powering on of the portable electronic device subsequent to the powered-down or a stand-by state of the portable electronic device, wherein powering on as aforesaid involves a complete exit of any low power state.

2. Portable electronic device according to claim 1,
   wherein the set of components comprises at least a central processing unit, an energy storage, a display, and a radio frequency transceiver.

3. Portable electronic device according to claim 1,
   wherein the calibration module is adapted to conduct the calibration measurement in response to a powering on of the portable electronic device only if the preceding powered-down or stand-by state lasted for at least a defined period in time.

4. Portable electronic device according to claim 1, wherein the calibration module is adapted to conduct the calibration measurement within a defined interval in time starting with the powering on of the portable electronic device.

5. Method for operating a portable electronic device containing a set of components radiating heat in an active state in response to the consumption of electrical energy, comprising sensing an ambient temperature of the portable electronic device by means of a temperature sensor, sensing at least one temperature inside the portable electronic device by at least one other temperature sensor, conducting a calibration measurement for determining a set of calibration parameters for adjusting the at least one sensed inside temperature, conducting the calibration measurement during or in connection with an inactive state of the components of the set, and determining a compensated ambient temperature dependent on at least the sensed ambient temperature and dependent on the at least one adjusted sensed inside temperature, wherein the calibration measurement is conducted subsequent to a period in time in which the portable electronic device was powered down or in a stand-by state and wherein the calibration measurement is conducted in response to powering on the portable electronic device, wherein powering on as aforesaid involves a complete exit of any low power state.

6. Method according to claim 5, wherein the calibration measurement is conducted during or in connection with at least the following components of the portable electronic device being inactive: a central processing unit, an energy storage, a display, and a radio frequency transceiver.

7. Method according to claim 5, wherein a powered-down or a stand-by state of the portable electronic device represents the inactive state of the components of the set.

8. Method according to claim 5, wherein the calibration measurement is conducted within a defined interval in time starting with the powering on of the portable electronic device.

9. Method according to claim 5, wherein the calibration measurement is conducted subsequent to a powered-down or a stand-by state of the portable electronic device provided the powered-down or the stand-by state lasted for at least a defined period in time.

10. Method according to claim 5, comprising
detecting inactive states of the components of the set, and
in response to detecting the inactive states of the components of the set conducting the calibration measurement.

11. Method according to claim 5, wherein at least one calibration parameter of the set is determined dependent on a deviation of an inside temperature from an ambient temperature, both sensed during the calibration measurement.

12. Method according to claim 11, wherein the calibration parameter for each other temperature sensor is determined dependent on a deviation of an inside temperature sensed by the respective other temperature sensor from the ambient temperature, each sensed during the calibration measurement.

13. Method according to claim 5, wherein at least one calibration parameter of the set is determined dependent on a compensated ambient temperature determined dependent on an ambient temperature and dependent on the at least one inside temperature, each sensed during the calibration measurement.

14. Method according to claim 13, wherein the at least one calibration parameter of the set is determined dependent on a deviation of the determined compensated ambient temperature from the sensed ambient temperature.

15. Non-transitory, tangible computer readable storage medium for operating a portable electronic device, containing computer program code for implementing a method according to claim 5 when executed on a central processing unit of the portable electronic device.

* * * * *